United States Patent
Gurtler et al.

(10) Patent No.: US 6,334,644 B1
(45) Date of Patent: Jan. 1, 2002

(54) VEHICLE WITH A MULTIPART LOWERABLE VEHICLE TOP

(75) Inventors: Dieter Gurtler, Grafenau; Arno Jambor, Vaihingen; Oliver Wagner, Filderstadt, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/421,351

(22) Filed: Oct. 18, 1999

(30) Foreign Application Priority Data

Oct. 17, 1998 (DE) .......................................... 198 47 983

(51) Int. Cl.$^7$ ................................................. B60J 7/00
(52) U.S. Cl. ....................................... 296/108; 296/117
(58) Field of Search ............................ 296/108, 107.09, 296/117

(56) References Cited

U.S. PATENT DOCUMENTS

| | | | |
|---|---|---|---|
| 3,097,883 A | * 7/1963 | Gilson | |
| 3,312,058 A | * 4/1967 | Shelhart | 296/117 X |
| 3,359,870 A | * 12/1967 | Purcell | 92/121 |
| 4,854,634 A | 8/1989 | Shiraishi et al. | 296/108 |
| 5,033,789 A | 7/1991 | Hayashi et al. | 296/216 |
| 5,467,596 A | * 11/1995 | Yu | 60/415 |
| 5,620,226 A | * 4/1997 | Sautter, Jr. | 296/107 |
| 5,772,274 A | * 6/1998 | Tokarz | 296/707 |
| 5,903,119 A | * 5/1999 | Laurain et al. | 318/265 |

FOREIGN PATENT DOCUMENTS

| | | | |
|---|---|---|---|
| DE | 3903358 | * | 8/1990 |
| DE | 39 37 986 | | 5/1991 |
| DE | 43 16 485 | | 11/1994 |
| DE | 44 06 376 | | 8/1995 |
| DE | 44 45 944 | | 4/1996 |
| DE | 195 39 086 | | 10/1996 |
| DE | 196 47 300 | | 5/1998 |
| DE | 19520648 | * | 12/1998 |
| EP | 835 778 | | 4/1998 |
| EP | 835 779 | | 4/1998 |
| EP | 0835780 | * | 4/1998 |
| FR | 733380 | | 10/1932 |

* cited by examiner

*Primary Examiner*—Dennis H. Pedder
(74) *Attorney, Agent, or Firm*—Crowell & Moring LLP

(57) ABSTRACT

A vehicle having a multipart lowerable vehicle top has at least two bending-resistant top elements. The top elements are swivellably connected with one another and, by way of at least one top element, are swivellably connected with the vehicle body. For connecting the top elements with one another and/or with a vehicle body, swivelling joints are provided such that, each connection having at least one drivable swivelling joint.

6 Claims, 2 Drawing Sheets

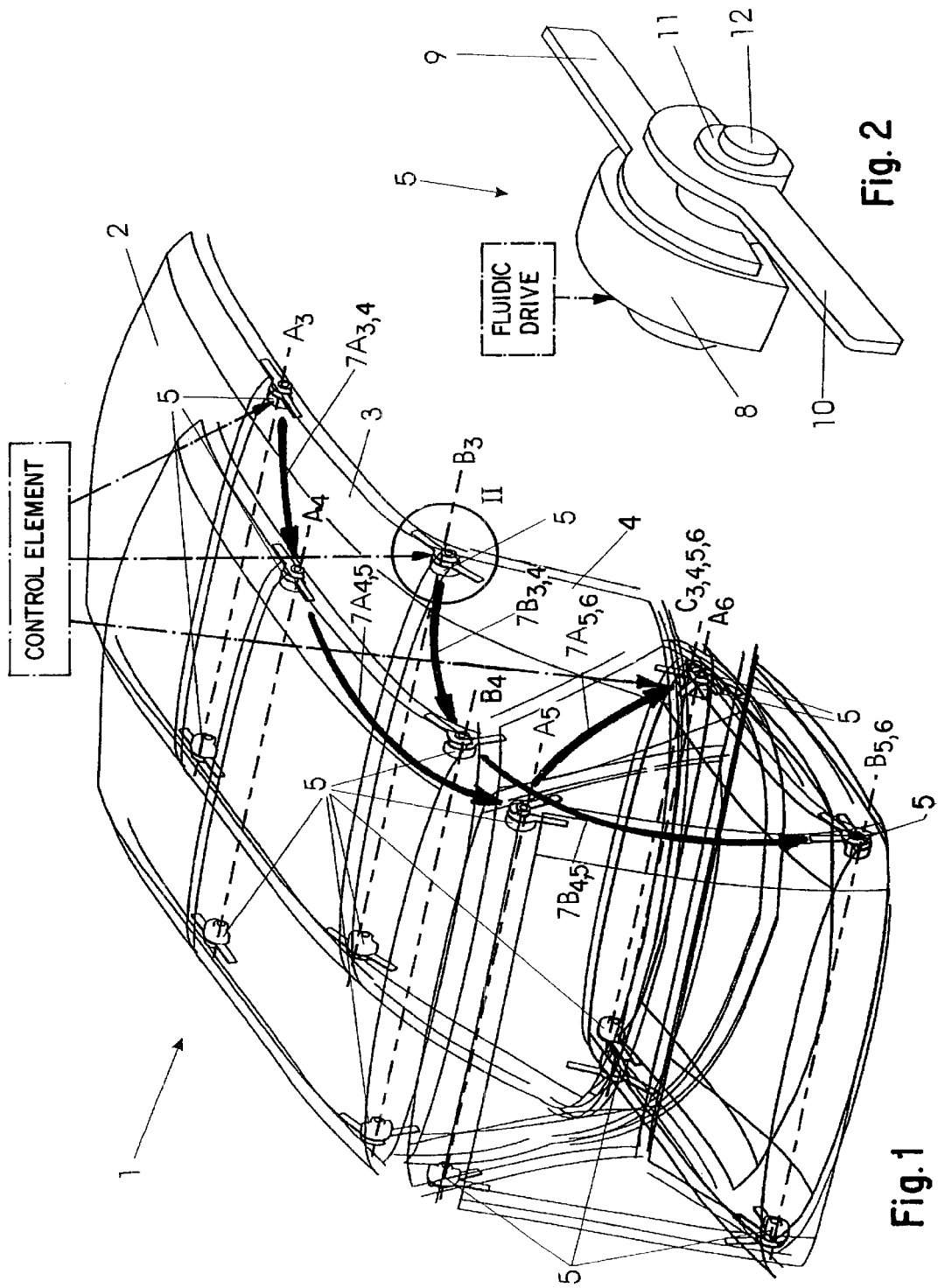

VEHICLE WITH A MULTIPART LOWERABLE VEHICLE TOP

BACKGROUND OF THE INVENTION

This application claims the priority of 198 47 983.2-21, filed Oct. 17, 1998, the disclosure of which is expressly incorporated by reference herein.

The present invention relates to a vehicle with a multipart lowerable vehicle top with at least two pending-resistant top elements, which a swivellably connected with one another and, by way of at least one top element, are swivellably connected with the vehicle body.

Lowerable folding tops, particularly also so-called hardtops made of firm vehicle body parts, are generally known. DE 44 45 944 C1 describes one such roof construction which consists of only two elements. The movement and the coordination of the individual roof parts here takes place by a very complex mechanism having control levers.

Other folding top arrangements and control elements are described in DE 195 39 086 C1; DE 43 16 485 A1; DE 39 03 358 A1; and DE 195 20 648 A1. The guiding of the vehicle top elements always takes place in guide rails or by linkages and control levers.

The relative movements of the roof parts with respect to one another must therefore be implemented at high mechanical expenditures. Thus, specific kinematics are, for example, always required which are designed for the respective geometrical shape of the hardtop. This represents a stark contrast to the economically, logistically and ecologically meaningful efforts of standardizing and reducing the variety of parts and types of vehicle elements.

Another disadvantage of using connecting link guides and control rods is the often poor operating quality. Particularly in the case of multipart vehicle tops, mainly in the case of vehicle tops which have more than two parts, these elements tend to jam in the guides.

The seal cut-throughs by the control levers represent another disadvantage. This point is particularly important with respect to many vehicle users' opinion that hardtops have a poorer quality than firm vehicle tops.

In addition to the purely mechanical problems concerning the stability and the method of operation of the lowerable vehicle top, the limited possibility of selecting lowering paths increasingly also presents a problem, particularly with a view to passengers situated in the vehicle and the operation of the lowerable vehicle top in narrow spaces (such as garages).

EP 0 835 778 A1; EP 0 835 779 A1; and EP 0 835 780 A1 relate to other such lowerable folding tops and illustrate the described problems on the example of three-part hardtops.

A driven rotary connection is described in DE 44 06 376 A1, in which the fluidically operable rotary drive is still of a very complex and geometrically projecting construction. However, such a drive makes, it is possible to implement also slow an extremely uniform rotating movements along a large torque range. Such drives are currently used in the vehicle suspension field, as also disclosed in DE 39 37 986 A1.

SUMMARY OF THE INVENTION

An object of the present invention is, therefore, to provide a vehicle with a multipart lowerable vehicle top which is distinguished by a movement apparatus which is as light and simple as possible and has a small number of parts. This movement apparatus is to be capable of implementing any lowering path desired by the user for the multipart lowerable vehicle top.

According to the present invention, this object has been achieved by providing that, for the connection of the at least two bending-resistant top elements with one another and/or with the vehicle body, swivelling joints are provided, per connection, at least one of the swivelling joints being drivable.

As the result of the connection of the individual top parts with one another or with the vehicle body only by way of swivel joints or active swivel joints, the heavy and very complex linkage which is susceptible to disturbances is completely eliminated, and the bearing and the drive are combined in one component. Problems concerning the sealing of the vehicle top which result from the fact that the linkage cuts through the seals will therefore no longer occur. As the result, the linkage can cause no difficulties, such as rattling or jamming.

The drivable swivel joints can be operated completely independently of one another to permit implementation of different lowering paths for the multipart lowerable vehicle top with a very simple electrical or electromechanical control.

In a particularly advantageous further development of the invention, the drivable swivelling joints are fluidically operated. Thereby, in addition to the mounting of the swivelling joints, only lines for the fluidic drive of the vehicle top must be laid.

BRIEF DESCRIPTION OF THE INVENTION

Other objects, advantages and novel features of the present invention will become apparent from the following detailed description of the invention when considered in conjunction with the accompanying drawings.

FIG. 1 is a top perspective view of a vehicle top arrangement on the example of a three-part lowerable vehicle top which is illustrated in four different positions;

FIG. 2 is an enlarged perspective view of a drivable swivelling joint (detail II in the circle) from FIG. 1;

DETAILED DESCRIPTION OF THE DRAWINGS

Figure 3:
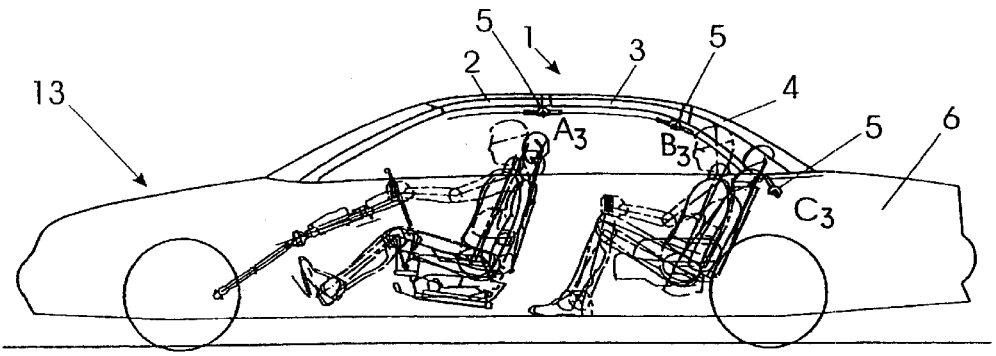
FIG. 3 is a side view of a vehicle having a closed multipart lowerable vehicle top.
Figure 4:
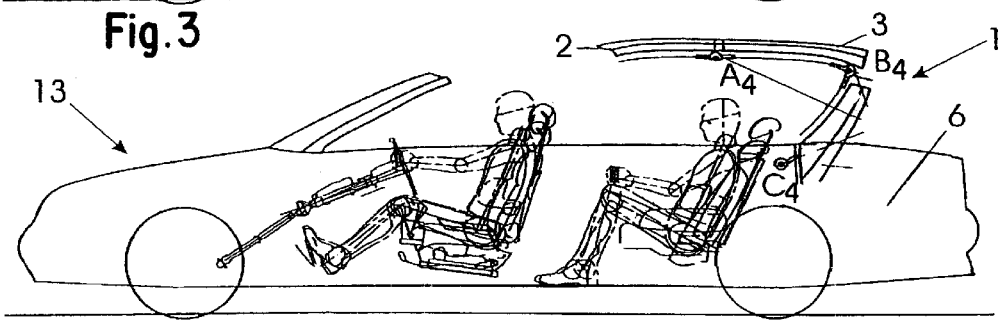
FIG. 4 is a side view of a vehicle similar to FIG. 3 but with a partially open vehicle top.

FIG. 1 illustrates a multipart lowerable vehicle top 1 shown in four different positions. FIGS. 3 to 6 also show these four positions but in side view. The vehicle top 1 has three top elements 2, 3, 4. By way of the rotation axis A, which has two laterally arranged active swivelling joints 5, the forward top element 2 is connected with the central top element 3. The opposite side of the central top element 3 is coupled by the rotation axis B with the rearward top element 4. On its opposite end, the rearward top element 4 has the rotation axis C which has a connection to a vehicle body 6 (illustrated in FIGS. 3 to 6). The rotation axes B, C also each have two active swivelling joints 5.

In FIG. 1, the above-described elements are each shown several times, because here the occurring lowering movement of the vehicle top 1 is illustrated in four steps, the arrows 7A, 7B indicating the movements of the rotation axes A, B. In the movement sequence of the vehicle top 1 during the lowering described in the following, the indices 3 to 6 indicate the respective position of the axes of rotation, as illustrated in the corresponding FIGS. 3 to 6.

In a first step of the lowering operation, the top elements 3, 4 are rotated about the rotation axes $B_3$ and $C_3$. The rotation axes C, which is stationarily connected with the vehicle body 6, maintains its position during the entire lowering operation. The rotation axis A moves along the arrow $7A_{3,4}$ to position $A_4$, without any relative movement of the top elements 2, 3, i.e., with respect to one another. From position $B_3$ of the rotation axis B, this axis moves along the path outlined by the arrow $7B_{3,4}$ to position $B_4$. This position of the vehicle top 1 is also visible in FIG. 4.

Figure 5:
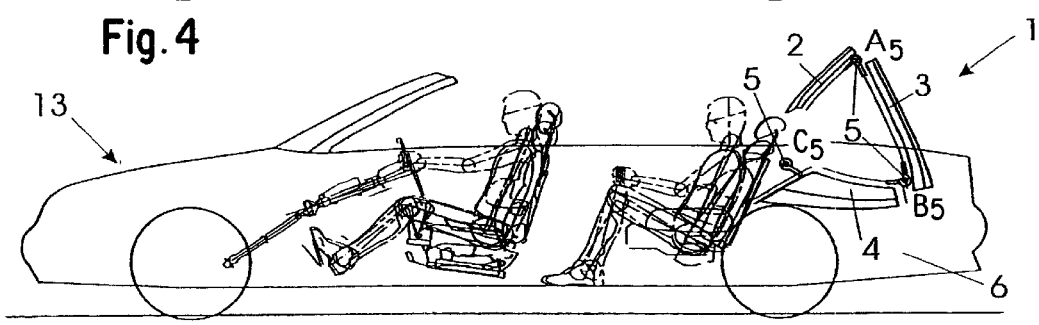
FIG. 5 is a side view of a vehicle similar to FIG. 3 but with a partially lowered vehicle top.
Figure 6:
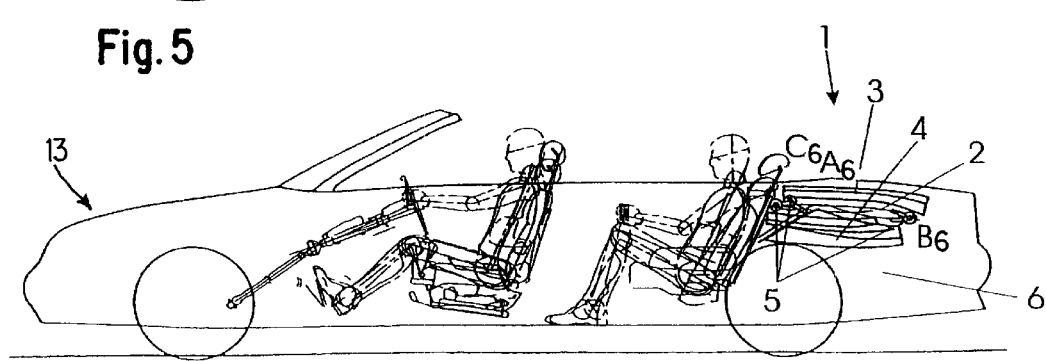
FIG. 6 is a side view of a vehicle similar to FIG. 3 but with a completely lowered vehicle top.

In the subsequent step of the lowering operation, the rotation axes A, B move along the paths indicated by the arrows $7A_{4,5}$ and $7B_{4,5}$ in a manner also shown in FIG. 5. In the last step of the lowering operation of the vehicle top 1, the rotation axis A then moves from its position $A_5$ into a position $A_6$ which is situated close to the rotation axis C. As also illustrated in FIG. 6, the lowering operation of the vehicle top 1 is therefore concluded. A closing of the opened vehicle top can take place, for example, in a precisely reversed sequence.

In addition to this lowering operation illustrated as an example, by the active swivelling joints 5, an arbitrary number of other variants can also be implemented. The active swivelling joints 5 which, in particular, are operated fluidically generally permit a swivelling range of approximately 200° and, mainly when operated hydraulically, allow a variation of the torque along large ranges. By way of a hydraulic unit, they can easily be adapted to the torque requirement at the individual swivelling points which is to be expected and differs considerably according to the type of the top. They are therefore very suitable for the object to be achieved according to the invention and, in a mirror-symmetrical arrangement, can also be used as standardized structural elements, which are reasonably priced as the result of the high piece numbers, in virtually all types of vehicle tops 1. As the result of their use, it becomes possible for the first time to consider multipart vehicle tops 1 because, by use of the previously customary control linkages, in the case of, for example, four or five top elements, these could almost not be implemented in practice and required extremely high expenditures.

FIG. 2 again shows the active swivelling joint 5 as an enlargement of the area II from FIG. 1. A housing 8 of the active swivelling joint 5 is shown which is fixedly, particularly non-rotatably, connected with a fitting 9. This unit, consisting of the housing 8 and the stationary fitting 9, is premounted on one of the top elements 2, 3, 4. On the top element 2, 3, 4, which follows in each case, and/or the vehicle body 6, a fitting 10 is then fixedly mounted. During the final mounting of the vehicle top 1, the fitting 10, which is later movable with respect to the housing 8, is mounted by of an intermediate piece 11, on a multitooth shaft 12 of the active swivelling joint 5. The fitting 10 and the intermediate piece 11 together form a holding element. Thus, when the top elements 2, 3, 4 are mounted, according to the pitch of the multitooth shaft 12, numerous angular positions of the fittings 9, 10 and thus of the corresponding top elements 2, 3, 4 connected with the fittings 9 10 can be implemented with respect to one another.

The multitooth shaft 12 represents the portion of the fluidically movable elements of the active swivelling joint 5 which projects out of the housing 8 and can be actively rotated with respect to the housing 8 and the fitting 9. As a result, the holding element, consisting of the fitting 10 and the intermediate piece 11, which is non-rotatably connected with the multitooth shaft 12, also moves with respect to the fitting 9, and the top elements 2, 3, 4 connected with the fittings 9, 10 experience a relative movement with respect to one another. FIGS. 3 through 6 show the above-described steps during the lowering of the folding top 1 on a vehicle 13.

Of course, it should be understood that the described procedure can also be used for fabric top elements 2, 3, 4 fixedly mounted on a bending-resistant frame. With respect to the mechanical control, the bending-resistant frames of the top elements will then correspond to the stiff elements of the hardtops.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle having a multipart lowerable vehicle top comprising at least two bending-resistant top elements swivellably connected with one another and, by way of at least one of the top elements, a swivellable connection is produced between the vehicle top and a body of the vehicle, wherein, for connection of the at least two bending-resistant top elements with one another and with the vehicle body, pairs of swivelling joints comprised of a rotatable shaft within a housing are provided for each connection, and at least one of the swivelling joints of each pair is drivably arranged.

2. The vehicle according to claim 1, wherein the at least one drivable swivelling joint has a fluidic drive.

3. The vehicle according to claim 1, wherein the at least one drivable swivelling joint is configured to be operated independently of the other swivelling joints.

4. The vehicle according to claim 3, wherein the at least one drivable swivelling joint has a fluidic drive.

5. The vehicle according to claim 3, wherein a control unit is provided for coordinating relative movements of the at least two top elements.

6. The vehicle according to claim 1, wherein at least one area of the shaft of the swivelling joints has a profile configured such that, the connection of the at least two top elements with at least one of one another and the vehicle body is effected by operative cooperation between a holding element associated with the top elements and the profile on the shaft.

* * * * *